(12) United States Patent
Allen et al.

(10) Patent No.: US 8,507,137 B2
(45) Date of Patent: Aug. 13, 2013

(54) SEPARATOR PLATE CONFIGURATION FOR A FUEL CELL

(75) Inventors: Glenn Michael Allen, Vernon, CT (US); Gennady Resnick, Prospect Heights, IL (US)

(73) Assignee: UTC Power Corporation, South Windsor, CT (US)

( * ) Notice: Subject to any disclaimer, the term of this patent is extended or adjusted under 35 U.S.C. 154(b) by 426 days.

(21) Appl. No.: 12/922,724

(22) PCT Filed: Apr. 23, 2008

(86) PCT No.: PCT/US2008/061201
§ 371 (c)(1),
(2), (4) Date: Sep. 15, 2010

(87) PCT Pub. No.: WO2009/131574
PCT Pub. Date: Oct. 29, 2009

(65) Prior Publication Data
US 2011/0008698 A1    Jan. 13, 2011

(51) Int. Cl.
*H01M 8/04* (2006.01)

(52) U.S. Cl.
USPC ............ 429/413; 429/437; 429/450; 429/514

(58) Field of Classification Search
None
See application file for complete search history.

(56) References Cited

U.S. PATENT DOCUMENTS

| | | | |
|---|---|---|---|
| 4,769,297 A * | 9/1988 | Reiser et al. ................ | 429/413 |
| 6,165,634 A | 12/2000 | Krasij et al. | |
| 6,197,442 B1 | 3/2001 | Gorman | |
| 6,673,481 B1 | 1/2004 | Reiser et al. | |
| 6,770,394 B2 | 8/2004 | Appleby et al. | |
| 7,435,502 B2 | 10/2008 | Breault et al. | |
| 7,638,217 B2 | 12/2009 | Darling et al. | |
| 2004/0001982 A1 | 1/2004 | Reiser et al. | |
| 2005/0064261 A1 | 3/2005 | Breault et al. | |
| 2005/0164071 A1 | 7/2005 | Horiguchi | |
| 2007/0072031 A1 | 3/2007 | Darling et al. | |

FOREIGN PATENT DOCUMENTS

| | | |
|---|---|---|
| JP | 6275284 | 9/1994 |
| JP | 9017437 | 1/1997 |
| WO | 2004006368 | 1/2004 |
| WO | 2008013523 | 1/2008 |

OTHER PUBLICATIONS

Machine translation of JP 06-275284, Sep. 1994.*
Machine translation of JP 09-017437, Jan. 1997.*

(Continued)

*Primary Examiner* — Jonathan Crepeau
(74) *Attorney, Agent, or Firm* — Carlson, Gaskey & Olds, P.C.

(57) ABSTRACT

A fuel cell includes a membrane electrode assembly comprised of a membrane sandwiched between anode and cathode catalyst structures. An anode separator plate and a cathode separator plate are arranged adjacent to the membrane electrode assembly opposite from one another. The anode and cathode separator plates include opposing sides in which one of the opposing sides of the anode and cathode respectively have fuel and oxidant flow fields in communication with the membrane. The anode separator plate is a structure having a first water permeability and is configured to permit passage of water between its opposing sides and with its flow field, and the cathode separator plate comprises a structure having a second water permeability less than the first water permeability of the anode separator plate. In one example, the anode is provided by a porous separator plate, and the cathode is provided by a non-porous, or solid, plate.

8 Claims, 2 Drawing Sheets

(56) References Cited

OTHER PUBLICATIONS

International Search Report for PCT Application No. PCT/US2008/061201, Aug. 6, 2008.

European Search Report for EP Application No. 08746592.8, Aug. 31, 2012.

Japanese Office Action for Application No. 2011-506245 dated Nov. 20, 2012.

* cited by examiner

US 8,507,137 B2

SEPARATOR PLATE CONFIGURATION FOR A FUEL CELL

BACKGROUND

This application relates to fuel cells, and more particularly, the application relates to a separator plate configuration for a fuel cell.

One type of fuel cell includes a proton exchange membrane (PEM) sandwiched between a cathode and an anode. In a PEM fuel cell, a hydrogen-containing fuel and an oxidizer are directed to opposite sides of the membrane, typically by way of reactant passageways and/or gas diffusion layers, as is known. A separator plate between the anode and cathode of adjacent cells prevents commingling of the reactant gases. The separator plate is typically comprised of an anode-side portion and a cathode-side portion, which portions may be made separately and assembled and, for convenience, are often referred to separately as an anode separator plate and a cathode separator plate, respectively. This latter-mentioned convention is employed herein. Product water is formed by an electrochemical reaction on a cathode side of the fuel cell, and the product water must be drawn away from the cathode side of the cell or it will block the passages to the electrochemical reaction sites, known as flooding.

Additionally, in a typical PEM fuel cell having a solid polymer electrolyte membrane, the heat of the electrochemical reaction tends to dehydrate the membrane, thereby increasing electrical resistance and decreasing performance. A critical challenge when operating a fuel cell is to keep the membrane humidified. Typically, makeup water must be provided to the cell in an amount that will prevent the proton exchange membrane from drying out. The makeup water may be provided through external or internal humidification of the reaction gases.

Some systems utilize a porous separator plate, commonly known as a water transport plate (WTP), between adjacent cells. In one configuration, reactant gas flows through channels on one side of each plate and coolant water flows on the other side. The pores in the plate are sized such that the capillary pressure of the water in the pores prevents reactant gas from crossing the plate to the coolant stream, creating a wet seal, yet allows liquid transfer across the plate if subjected to a pressure differential. These porous plates have characteristics, such as bubble pressure and water permeability, that are used to control the flow of water across the plates. Prior art fuel cells using porous separator plates typically utilize plates having the same characteristic relating to bubble pressure and water permeability, and thus also pore size, whether associated with the anode or with the cathode. Bubble pressure and water permeability are inversely related such that they must be balanced when manufacturing WTPs. Typically, both bubble pressure and water permeability are maximized until an acceptable compromise is reached, which can make manufacture difficult and more costly. This is discussed in commonly-owned U.S. Pat. No. 6,197,442 to Gorman.

The separator plates discussed above are typically used in fuel cell systems that rely on total water management (TWM) for cooling, in which coolant is circulated by a pump and pressure differentials are created across the plate. Other types of fuel cells may utilize non-porous (herein termed "solid") separator plates that prevent the flow of water across the plates. Similar to porous separator plates, solid separator plates provide reactant flow fields on one side and coolant flow fields on the opposite side.

What is needed is a separator plate, or water transport plate, having characteristics that are less costly to achieve while providing desired fuel cell performance.

SUMMARY

A fuel cell includes a membrane electrode assembly (MEA) comprised of a proton exchange, or polymer electrolyte, membrane (PEM) with anode and cathode catalysts on respectively opposite sides thereof. An anode-side structure and a cathode-side structure are arranged adjacent to the MEA opposite from one another, and collectively form most of the active portion of a fuel cell. The anode-side and cathode-side structures are more precisely identified as anode and cathode separator plates respectively, and include opposing sides in which one of the opposing sides of each of the anode and cathode separator plates has respective fuel and oxidant flow fields in communication with the membrane electrode assembly. One of the anode and cathode separator plates includes a water permeable structure configured to permit passage of water between its opposing sides to and from its flow field. The other of the anode and cathode separator plates includes a relatively less water permeable structure than the one, and is configured to relatively decrease or inhibit passage of water between its opposing sides compared to the more water permeable separator plate. In one example, the anode is provided by a porous separator plate, and the cathode is provided by a relatively less porous separator plate, as by a non-porous, i.e., "solid", separator plate. Use of such separator plates having different water permeabilities is particularly advantageous in fuel cell systems that rely on natural water management, including evaporative cooling, as contrasted with total water management systems.

These and other features of the application can be best understood from the following specification and drawings, the following of which is a brief description.

DETAILED DESCRIPTION

Figure 1:
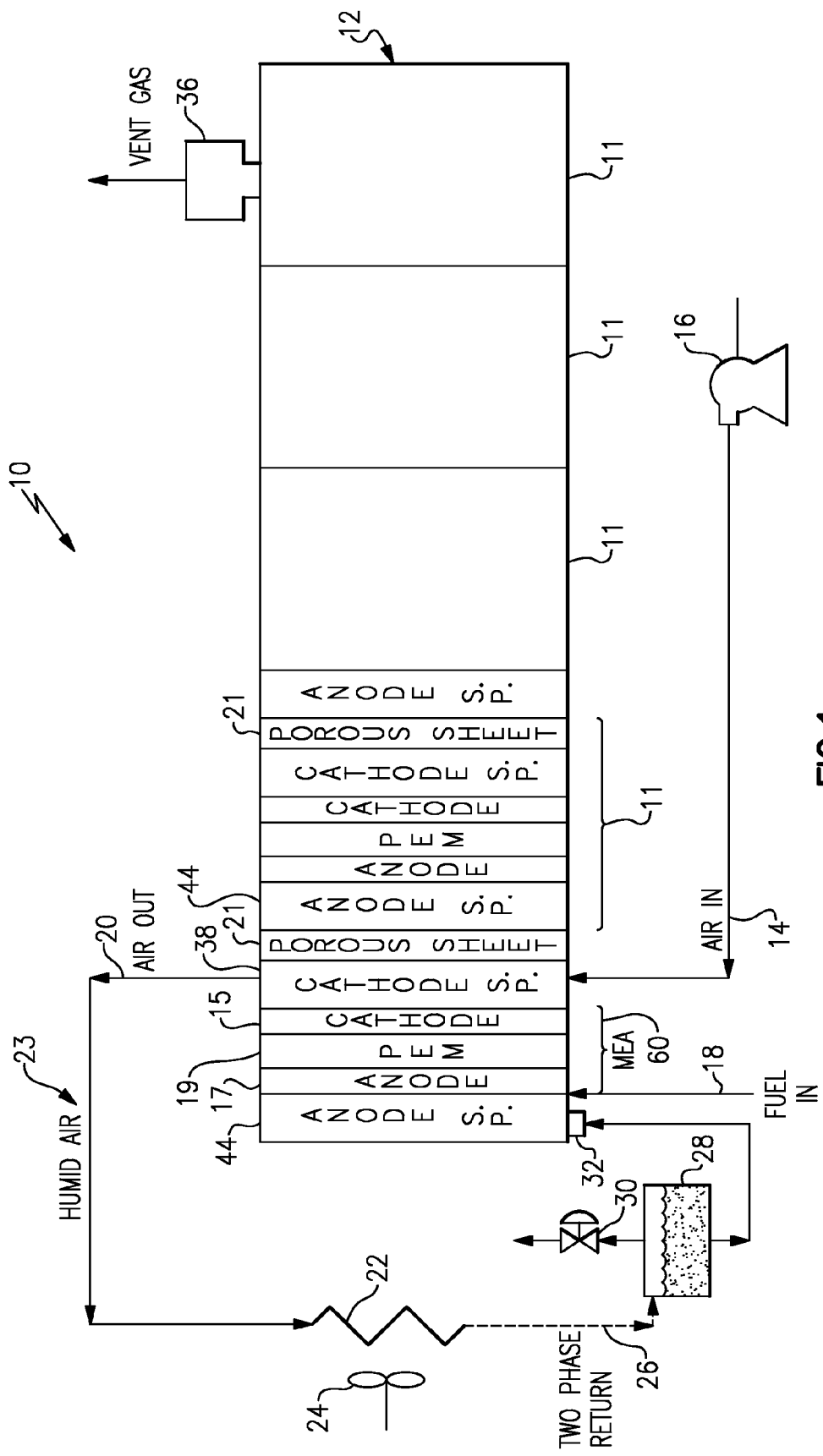
FIG. 1 is a schematic view of an example evaporatively-cooled fuel cell system.

An evaporatively-cooled fuel cell system 10 is schematically shown in FIG. 1. Unlike a total water management (TWM) cooling system that relies on a pump to circulate water and also develops greater pressure differentials across, or through the thickness of, the separator plates, the evaporatively-cooled system 10 is referred to as a natural water management (NWM) system that relies upon evaporation to dispel heat and typically operates with a much lower pressure differential. This makes it possible to use separator plates having bubble pressures and water permeabilities different than for TWM systems and which may be structured according to whether they are associated with the anode or the cathode.

The system 10 includes a fuel cell stack 12 comprised of a number of fuel cells 11. A fuel cell 11 includes a MEA 60 comprised of a cathode, or cathode catalyst, 15 and an anode, or anode catalyst, 17 on respectively opposite faces of a proton exchange membrane (PEM) 19. A thin gas diffusion layer (GDL) (not shown in detail in FIGS. 1 and 2) is typically also adjacent each of the cathode 15 and anode 17 to form a unitized electrode assembly (UEA). As further described herein, the MEA 60 will be assumed to include those GDL's and be the equivalent of the UEA.

The cathode 15 receives an oxidant, such as air, through an inlet 14. The air is delivered to the cathode 15 using a blower 16, for example. The anode 17 receives fuel, such as hydrogen, from a fuel inlet 18.

Each fuel cell 11 contains coolant water and product water, which is produced as part of the electrochemical reaction within the fuel cell. Separator plates, sometimes also referred to as water transport plates (WTP), 38 and 44 are arranged within the fuel cell 12. A cathode separator plate 38 is positioned adjacent the cathode face 15 of the MEA 60, and an anode separator plate 44 is positioned adjacent the anode face 17 of the MEA. Macroporous sheets 21 are arranged adjacent to and typically between, the separator plates 38 and 44 for the collection and removal of gas from water in the cell.

The fuel cell system 10 employs a cooling loop 23 as part of the fuel cell stack's thermal management system. Water formed as a byproduct of the electrochemical reaction, as well as water passing through the PEM 19 by proton drag, is evaporated off the cathode 15 into the cathode air stream at the cathode separator plate 38, where it is schematically shown as exiting the fuel cell 11 and stack 12 at air outlet 20 as humid air, and enters the cooling loop 23.

The humid air at air outlet 20 circulates in loop 23 to a heat exchanger 22 that condenses the humid air with the assistance of a fan 24, as is known in the art. A two phase mixture 26 of coolant water and air leaves the heat exchanger 22 and circulates to a water separator/reservoir 28 where the coolant water collects. The gas ingested by the evaporative cooling loop 23 is expelled through a back pressure valve 30, which controls the coolant inlet pressure. The coolant water flows from the water separator/reservoir 28 to a coolant inlet 32 into the fuel cell stack 12.

In the example evaporatively-cooled fuel cell system 10, the fuel cells 11 rely on evaporation to dispel heat rather than relying upon a pump circulating coolant water (sometimes referred to as "sensible cooling"). In an evaporatively-cooled system, the cathode side of the fuel cell is not as dependent upon water permeability in the cathode separator plate 38 since it is not necessary to provide a path for product water into coolant like some fuel cell configurations. Conversely, the anode side is not as dependent upon bubble pressure and water permeability in the anode separator plate 44 due to the lack of significant pressure differential across the anode separator plate in this type of example fuel cell.

Figure 2:
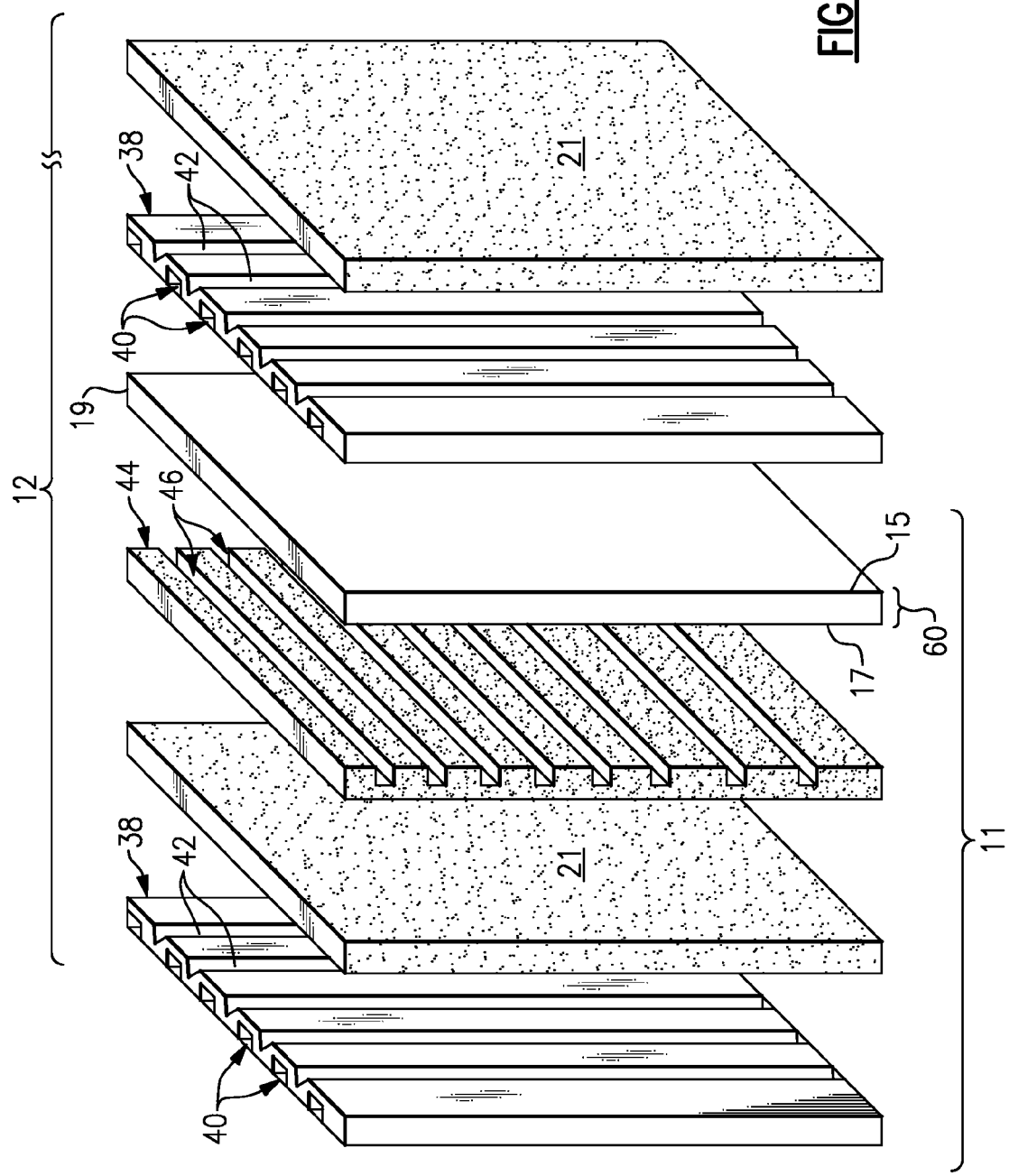
FIG. 2 is an exploded view of a fuel cell within a fuel cell stack.

FIG. 2 illustrates an exploded view of the separator plates 38 and 44, and porous sheet 21, arranged about the MEA 60. The cathode separator plate 38 has air flow fields 40 on a side facing the cathode face of the MEA 60 and coolant flow fields 42 on its opposite side. The porous sheet 21 is arranged adjacent to the coolant flow fields 42 for allowing air bubbles trapped or entrained in the coolant to be removed via vent 36 of FIG. 1. The cells 11 are configured such that the porous sheets 21 are arranged between the cathode separator plate 38 and the anode separator plate 44, such that coolant in flow fields 42 may also contact the anode separator plate 44.

The anode separator plate 44 includes fuel flow fields 46 arranged on a side facing the anode face of the MEA 60. As discussed above, the cathode and anode separator plates 38, 44 need only perform to meet the demands placed on them for a particular fuel cell design. As such, the cathode and anode separator plates 38, 44 can be constructed more efficiently and inexpensively by avoiding maximization for bubble pressure and water permeability where only one of those characteristics is more important than the other. To that end, the fuel cells 11 of the example fuel cell stack 12 use different cathode and anode separator plates 38, 44, each having different characteristics.

In a general example, the anode separator plate 44 absorbs water from the very permeable macroporous sheet 21 and coolant flow fields 42 to facilitate in-plate water distribution and hydration of the PEM 19. Optionally, some water from the porous sheet 21 and the coolant flow fields 42 in the cathode separator plate 38 may migrate through the separator plate 38 and evaporate into the air flow field 40 before it is carried out through the air outlet 20 and into the cooling loop 23 to be condensed and returned to the stack. Some water travels backward though the PEM 19, which also humidifies the anode side.

In one example, the cathode separator plate 38 is less porous or less water permeable than the anode separator plate 44. For example, in the extreme, the cathode separator plate 38 is non-porous, herein said to be "solid" (preventing water from passing across the plate), and the anode separator plate 44 is porous. Stated another way, the cathode separator plate 38 is less water permeable than the anode separator plate in permitting water to pass between its opposing sides. Solid plates can be considerably less expensive to manufacture than porous plates. Moreover, porous plates not needing high bubble pressures and high water permeability are also less expensive.

Generally, the separator plates 38 and 44 are formed of at least graphitized powder and a polymer-based resin, and may additionally include fibers and other materials as required. Moreover, the various parameters of the cathode separator plates 38 and the anode separator plates 44, such as pore structure, resistivity, particle size, resin content and yield strength, are selected to obtain the bubble pressure characteristics and water permeability desired for the respective plates. Importantly, those bubble pressure and water permeability characteristics may, and typically will, differ between the anode separator plates 44 relative to the cathode separator plates 38, with the cathode separator plates 38 characteristically being less water permeable than the anode separator plates 44. The values of these characteristics, and the differences between them, will vary from system to system, depending on the particular specifications and requirements of the fuel cell system.

Although a preferred embodiment of this application has been disclosed, a worker of ordinary skill in this art would recognize that certain modifications would come within the scope of the claims. For example, although sheets 21 are normally present, they may not be needed in all arrangements. For that reason, the following claims should be studied to determine their true scope and content.

The invention claimed is:
1. A fuel cell comprising:
a membrane electrode assembly;
an anode separator plate and a cathode separator plate arranged adjacent to the membrane electrode assembly opposite from one another, the anode separator plate and the cathode separator plate each including opposing sides in which one of the opposing sides of each of the anode separator plate and the cathode separator plate has respective fuel and oxidant flow fields in communication with the membrane electrode assembly, the anode separator plate having a first water permeability at the fuel flow field and configured to permit passage of water between its opposing sides and with its flow field, and the cathode separator plate having a second water per- meability between its opposing sides at the oxidant flow field that is less than the first water permeability of the anode separator plate; and a porous sheet arranged between the anode and cathode separator plates.

2. The fuel cell according to claim 1, wherein the cathode separator plate is a solid plate preventing the passage of water between its opposing sides.

3. The fuel cell according to claim 1, wherein the cathode separator plate includes a coolant flow field on a side opposite the oxidant flow field, the coolant flow field being adjacent to the porous sheet.

4. The fuel cell according to claim 1, wherein at least the anode separator plate is porous to at least partly provide said first water permeability.

5. The fuel cell according to claim 1, wherein the anode and cathode separator plates are structured to include bubble pressures different than one another.

6. The fuel cell according to claim 1, wherein the fuel cell is evaporatively cooled, and further comprising a cooling loop including the oxidant flow field in fluid communication with a condenser that is arranged between the oxidant flow field and a water separator, the water separator fluidly connected to a coolant inlet that is in fluid communication with a coolant flow field of at least one of the anode and cathode separator plates.

7. The fuel cell according to claim 1, wherein the anode separator plate comprises a porous separator plate and the cathode separator plate comprises a solid separator plate.

8. The fuel cell according to claim 1, wherein the porous sheet is water permeable.

* * * * *